United States Patent
Weldon et al.

(10) Patent No.: US 9,784,224 B2
(45) Date of Patent: Oct. 10, 2017

(54) LATCHING SOLENOID EXHAUST GAS RECIRCULATION VALVE ASSEMBLY

(71) Applicant: Continental Automotive Systems, Inc., Auburn Hills, MI (US)

(72) Inventors: Craig Andrew Weldon, Chatham (CA); David William Balsdon, Chatham (CA); Rick Vanwetten, Thamesville (CA); Raymond Rasokas, Thamesville (CA); William Charles Gillier, Chatham (CA)

(73) Assignee: Continental Automotive Systems, Inc., AuburnHills, MI (US)

( * ) Notice: Subject to any disclaimer, the term of this patent is extended or adjusted under 35 U.S.C. 154(b) by 206 days.

(21) Appl. No.: 14/885,176

(22) Filed: Oct. 16, 2015

(65) Prior Publication Data

US 2017/0107953 A1 Apr. 20, 2017

(51) Int. Cl.
*F16K 31/06* (2006.01)
*F02M 26/67* (2016.01)
*F02M 26/53* (2016.01)
*F02M 26/68* (2016.01)
*F16K 31/10* (2006.01)
*F16K 31/524* (2006.01)
*F16K 31/00* (2006.01)

(52) U.S. Cl.
CPC ............ *F02M 26/67* (2016.02); *F02M 26/53* (2016.02); *F02M 26/68* (2016.02); *F16K 31/003* (2013.01); *F16K 31/0655* (2013.01); *F16K 31/10* (2013.01); *F16K 31/52408* (2013.01)

(58) Field of Classification Search
CPC ........ F02M 26/67; F02M 26/68; F02M 26/53; F16K 31/10; F16K 31/0655; F16K 31/52408; F16K 31/003
USPC ......................................... 251/129.15, 129.2
See application file for complete search history.

(56) References Cited

U.S. PATENT DOCUMENTS

| | | | | |
|---|---|---|---|---|
| 3,870,275 A | * | 3/1975 | Kallel ..................... | F16K 31/10 251/215 |
| 6,669,165 B2 | * | 12/2003 | Burke ..................... | F16K 31/06 251/102 |
| 9,217,511 B2 | * | 12/2015 | Williams ............ | F16K 31/0606 |
| 2014/0264113 A1 | * | 9/2014 | Grover ................ | F16K 31/0655 251/129.15 |

* cited by examiner

*Primary Examiner* — Ian Paquette

(57) ABSTRACT

A valve assembly for an exhaust gas recirculation (EGR) system which provides emission control, regulates flow of exhaust gases, and is suitable for gasoline or diesel applications. The EGR valve assembly is a latching valve assembly which reduces power consumption (i.e., continuous electric draw) from the battery while the valve is either being held open or closed, and reduces electrical interference inherent with integrated position sensors. The valve assembly includes a latching mechanism controlled by an actuator which allows a valve to latch open or closed. The valve may be a single stage valve or a multi-stage valve, which includes a latching mechanism that allows for intermediate open positions, and uses of only a short, single pulse of voltage, to change the state of the valve. The actuator may also be held energized at full extend, maintaining a maximum valve open position, creating additional flow capability of the valve assembly.

27 Claims, 12 Drawing Sheets

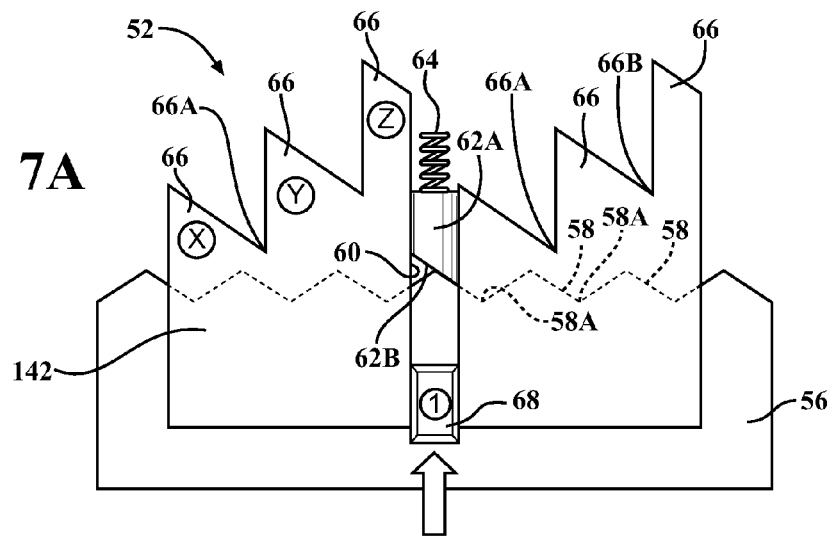
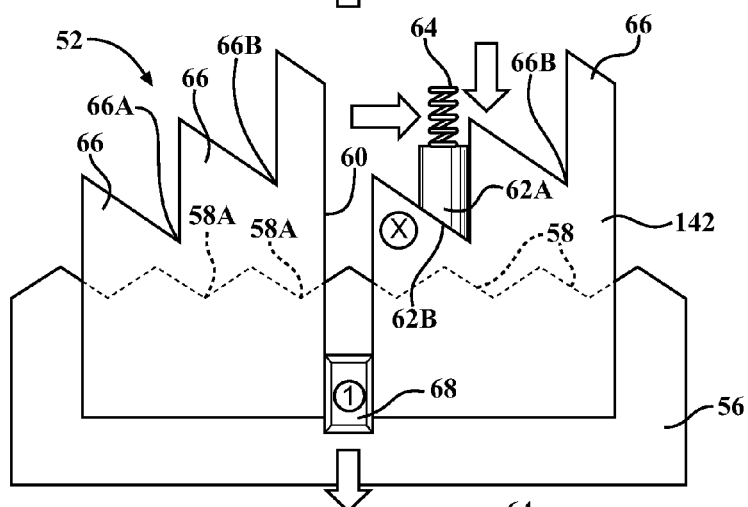
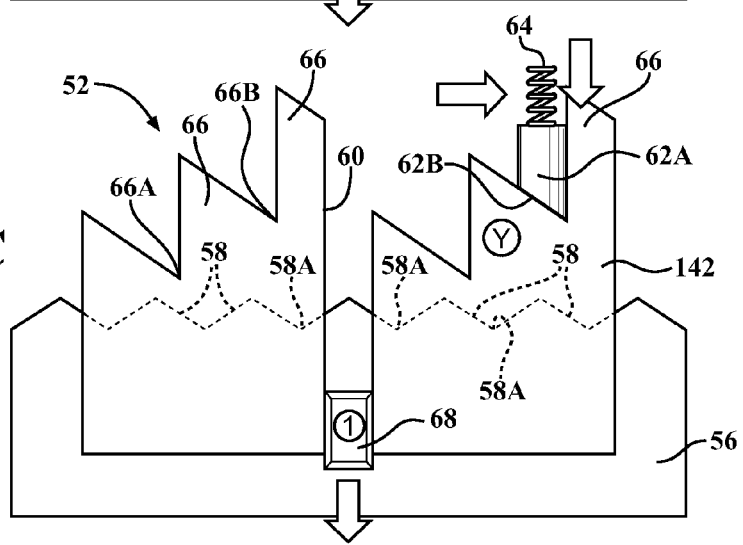

LATCHING SOLENOID EXHAUST GAS RECIRCULATION VALVE ASSEMBLY

FIELD OF THE INVENTION

The invention relates generally to an internal combustion exhaust system having an exhaust gas recirculation (EGR) valve assembly, where the EGR valve assembly includes a latching mechanism which maintains the EGR valve assembly in an open position or closed position when no electric power is used.

BACKGROUND OF THE INVENTION

Exhaust Gas Recirculation (EGR) provides an effective means to reduce nitrous oxide emissions (NOx) from the vehicle. The reintroduction rate of exhaust gases is controlled by an EGR valve. The exhaust gases displace available oxygen ($O_2$) to slow the fuel burn rate, and thus the peak combustion temperature is reduced. The byproduct of the cooler combustion temperature is reduction in thermally sensitive emissions of NOx.

One of the requirements for proper operation of an EGR system is that the EGR valve must seal in the normally closed position, preventing exhaust gases from leaking into the intake manifold. The EGR valve must also regulate the flow of exhaust gases, which is typically achieved using a linear-style valve. Regulation of the flow rate is typically achieved with a positional feedback sensor. This duality of sensory feedback and variable power consumption may be significant for variable speed (rpm) engines.

Accordingly, there exists a need for a valve assembly which is able to remain in an open position or closed position to regulate the flow of exhaust gas, while at the same time minimizing the amount of energy used to maintain the valve in the open position. There is also a need for a valve assembly which meets current packaging requirements, and is capable of performing multi-stage regulation of exhaust gas flow.

SUMMARY OF THE INVENTION

The present invention is a valve assembly for an exhaust gas recirculation (EGR) system which provides emission control, and regulates flow of exhaust gases reintroduced into the engine intake manifold. The valve assembly of the present invention is suitable for gasoline or diesel applications.

The EGR valve assembly of the present invention is a latching valve assembly which reduces power consumption (i.e., continuous electric draw) from the battery while the valve is either being held open or closed, and reduces electrical interference inherent with integrated position sensors.

In an embodiment, the valve assembly of the present invention includes a latching mechanism controlled by an actuator which allows a valve to latch open, or closed. In one embodiment, the valve may be a single stage valve, and uses only a short, single pulse of voltage, to change the state of the valve. In another embodiment, the present invention is a multi-stage valve which includes a latching mechanism that allows for intermediate open positions, and again uses only a short, single pulse of voltage, to change the state of the valve. Because of the use of only a short, single pulse of voltage to change the position of the valve assembly, the valve assembly of the present invention is physically smaller as compared to a large dynamic linear solenoid required of typical electronic EGR systems. In yet other embodiments, the actuator is also held energized at full extend, maintaining a maximum valve open position, in effect creating additional flow capability of the valve assembly. A secondary pulsed signal (PWM signal) effectually holds the valve in the maximum open state with reduced power consumption after being energized (i.e., a peak-and-hold signal).

In one embodiment, the present invention is a valve assembly having an upper housing which includes a cavity, a lower housing which includes an exhaust cavity, and an actuator and latching mechanism disposed in the cavity of the upper housing. The latching mechanism includes an index mechanism and a guide selectively engaged with the index mechanism. A valve seat is located in the lower housing and is in fluid communication with the exhaust cavity formed as part of the lower housing. A valve member is connected to and controlled by the actuator, such that he valve member is selectively in contact with the valve seat. The latching mechanism places the valve member in a closed position such that the valve member is in contact with the valve seat and the index mechanism is disengaged from the guide, preventing exhaust gas from flowing through the exhaust cavity formed as part of the lower housing. The latching mechanism also places the valve member in one of a plurality of open positions, where the valve member is moved away from the valve seat and the index mechanism is engaged with the guide, allowing exhaust gas to flow through the exhaust cavity of the lower housing.

The latching mechanism also includes an indexing latch connected to the actuator, a first plurality of teeth formed as part of the indexing latch, a second plurality of teeth formed as part of the guide, a plurality of vertexes, each of which is located in between two of the second plurality of teeth, and a plurality of indexing teeth formed as part of the index mechanism. The first plurality of teeth is engaged with the indexing teeth when the valve member is in the closed position. The second plurality of teeth is configured such that a portion of the plurality of vertexes are located at a first distance from the valve seat, and a second portion of the plurality of vertexes are located at a second distance from the valve seat. Each one of the plurality of indexing teeth is engaged with a corresponding one of the first portion of the plurality of vertexes when the valve member is in the first of the plurality of open positions, and each one of the plurality of indexing teeth is engaged with a corresponding one of the second portion of the plurality of vertexes when the valve member is in the second of the plurality of open positions.

A plurality of slots is formed as part of the guide, and each of the plurality of indexing teeth are disposed in a corresponding one of the plurality of slots and engaged with the first plurality of teeth when the valve is in the closed position, and the plurality of indexing teeth are removed from the plurality of slots, and disengaged from the first plurality of teeth when the valve is in one of the plurality of open positions.

A load spring biases the index mechanism such that the valve is biased towards the valve seat (i.e., closed), and a return spring substantially surrounds part of the armature such that the return spring is in contact with part of the armature. The return spring biases the index mechanism such that the valve is biased towards the valve seat, and the actuator is activated to move the armature and the valve member against the force of the load spring and the return spring, and the valve member away from the valve seat, when the valve is in the closed position.

The first plurality of teeth are engaged with the indexing teeth when the valve is in the closed position, and when the actuator is activated, the armature moves the indexing latch and valve, causing the first plurality of teeth to engage with the indexing teeth and move the index mechanism such that the index mechanism rotates about the armature. When the actuator is then deactivated, the first plurality of teeth engage with the second plurality of teeth, further rotating the index mechanism about the armature and engaging the indexing teeth with a first portion of the vertexes. The indexing latch then disengages from the first plurality of teeth, placing the valve in a first of the plurality of open positions.

In one embodiment, the valve assembly is a multi-stage valve assembly, where the actuator is again activated when the valve is in the first of the plurality of open positions, such that the armature again moves the indexing latch and valve, causing the first plurality of teeth to engage with the indexing teeth and move the index mechanism such that the index mechanism disengages from the guide and rotates about the armature. When the actuator is deactivated, the indexing teeth reengage with the second plurality of teeth such that the index mechanism further rotates about the armature and the indexing teeth engage with a second portion of the vertexes, and the first plurality of teeth disengage from the index mechanism, placing the valve in a second of the plurality of open positions. The actuator is again activated when the valve is in the second of the plurality of open positions, such that the armature again moves the indexing latch and valve, causing the first plurality of teeth to engage with the indexing teeth and move the index mechanism such that the indexing teeth disengage from the second portion of the plurality of vertexes and the index mechanism rotates about the armature. When the actuator is again deactivated, the indexing latch and the index mechanism moves such that the valve member is placed back in the closed position.

In another embodiment, the valve assembly is a multi-stage valve assembly having incremental stops, where the actuator is again activated when the valve is in the first of the plurality of open positions, such that the armature again moves the indexing latch and valve, causing the first plurality of teeth to engage with and the indexing teeth and move the index mechanism such that the indexing teeth disengage from the first portion of the plurality of vertexes and the indexing mechanism rotates about the armature. When the actuator is deactivated, the indexing latch and the index mechanism move such that the valve member is placed back in the closed position. When the actuator is again activated and the valve is in the closed position, the armature again moves the indexing latch and valve, causing the first plurality of teeth to engage with the indexing teeth and move the index mechanism such that the index mechanism rotates about the armature, and when the actuator is again deactivated, the indexing teeth engage with the second plurality of teeth, and the index mechanism further rotates about the armature and the indexing teeth engage with a second portion of the vertexes, and the first plurality of teeth disengage from the index mechanism, placing the valve in a second of the plurality of open positions.

The EGR system includes an exhaust recirculation conduit and an intake conduit, both of which are in fluid communication with the exhaust cavity formed as part of the lower housing. The valve member is changed between the closed position and one of the plurality of open positions to control the flow of exhaust gas through the exhaust cavity formed as part of the lower housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 7A is a diagram of a second embodiment of a latching mechanism used as part of an exhaust gas recirculation valve assembly, where the latching mechanism is configured such that the indexing latch is fully retracted prior to actuation, and exhaust gas recirculation valve assembly is in a closed position, according to embodiments of the present invention;

FIG. 7B is a diagram of a second embodiment of a latching mechanism used as part of an exhaust gas recirculation valve assembly, where the latching mechanism is configured such that the indexing latch is fully retracted after the exhaust gas recirculation valve assembly is moved to one of a plurality of open positions, according to embodiments of the present invention;

FIG. 7C is a diagram of a second embodiment of a latching mechanism used as part of an exhaust gas recirculation valve assembly, where the latching mechanism is configured such that the indexing latch is fully retracted, and the exhaust gas recirculation valve assembly is held in one of a plurality of open positions, according to embodiments of the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
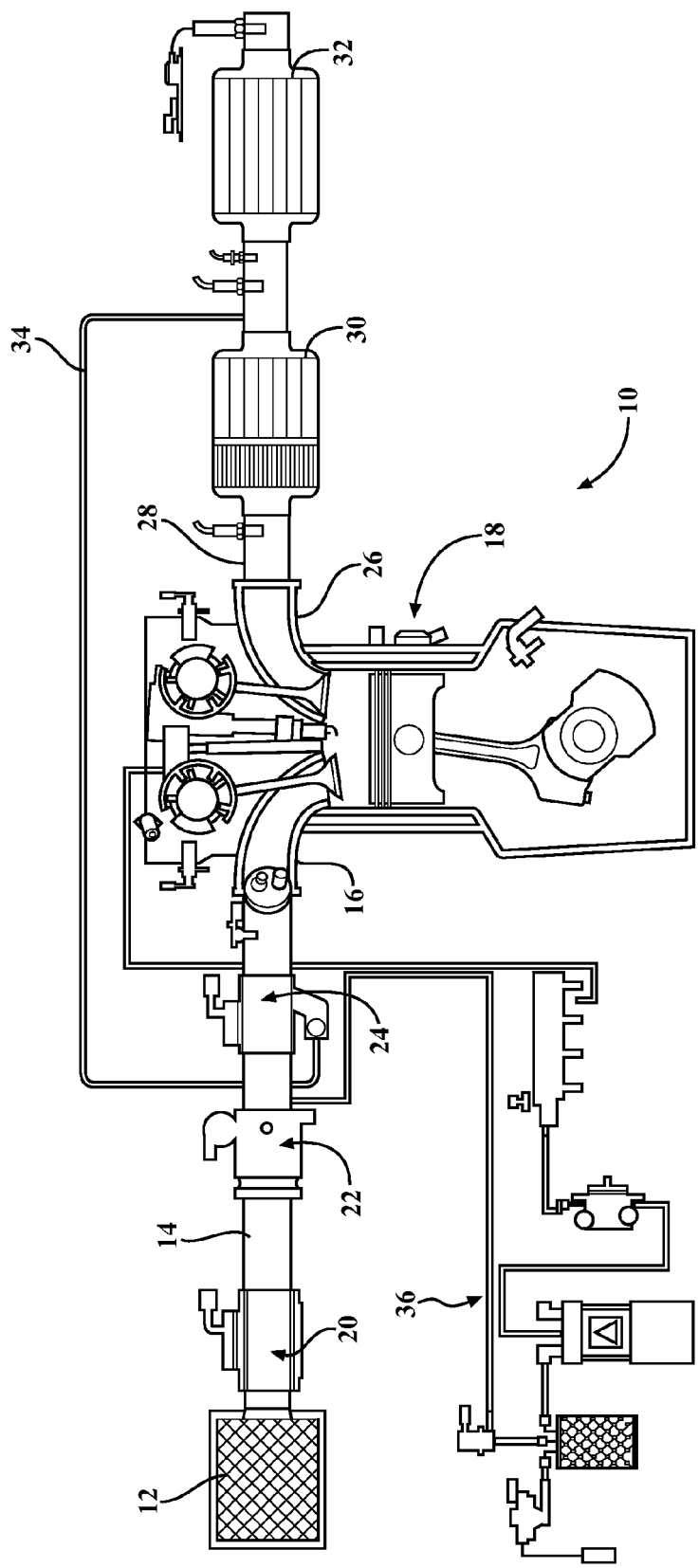
FIG. 1 is a diagram of an exhaust gas recirculation system for a gasoline engine having at least one valve incorporating a latching mechanism, according to embodiments of the present invention.
Figure 2:
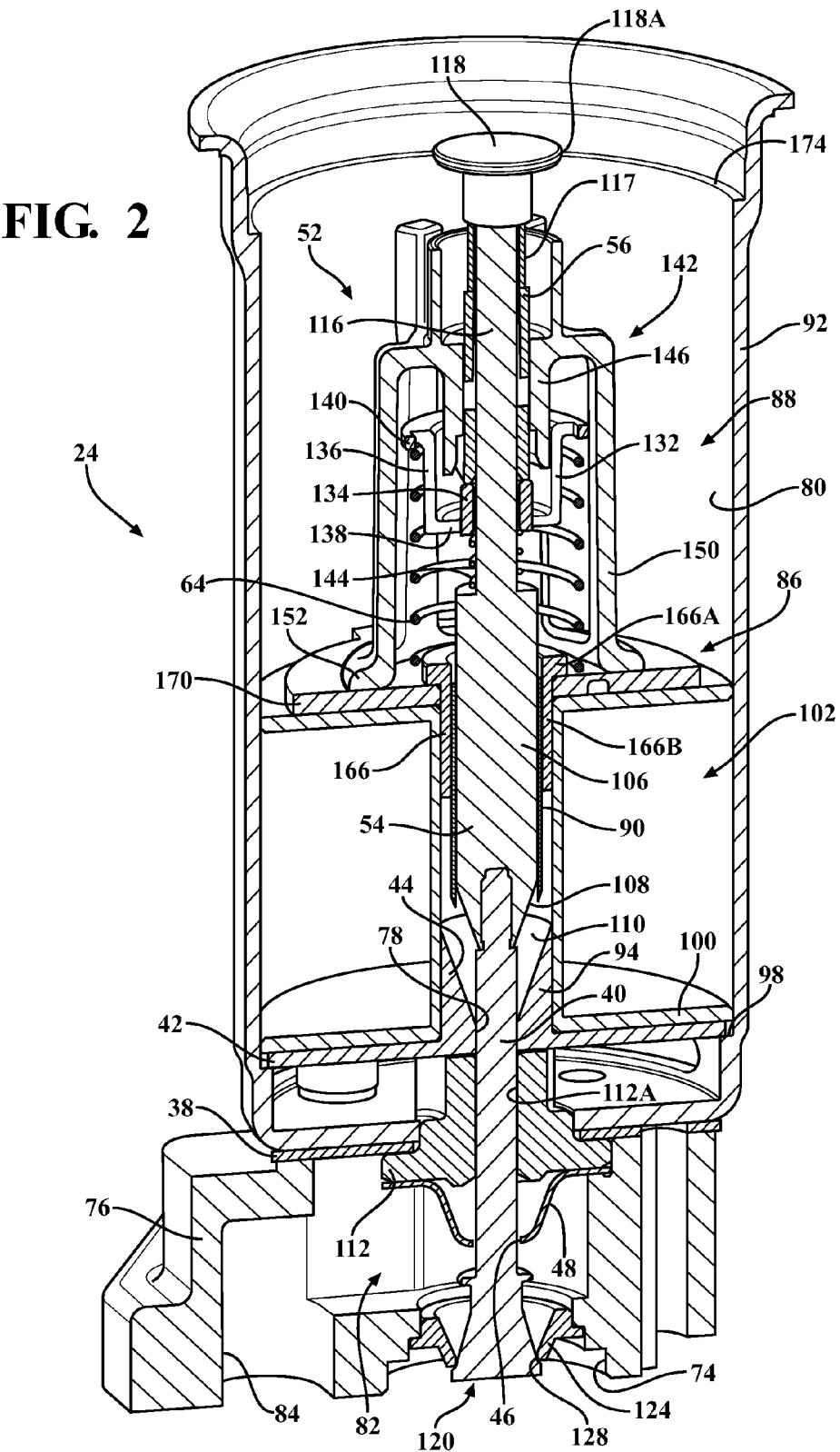
FIG. 2 is a perspective sectional view of a latching exhaust gas recirculation valve assembly, according to embodiments of the present invention.

A diagram of an air flow system having an exhaust gas recirculation (EGR) valve according to the present invention is shown in FIG. 1 generally at 10. The system 10 includes an air filter 12 connected to an intake conduit 14. The intake conduit 14 is connected to an intake manifold 16 of an engine, shown generally at 18. Disposed within the intake conduit 14 is a manifold absolute pressure (MAP) sensor, shown generally at 20, a throttle control valve, shown generally at 22, and an exhaust gas recirculation (EGR) valve assembly, shown generally at 24.

The engine 18 also includes an exhaust manifold 26, connected to the exhaust manifold 26 is an exhaust conduit 28, and disposed in the exhaust conduit 28 is a first catalyst 30 and a second catalyst 32. Connected to the exhaust conduit 28 is a recirculation conduit 34, where the recirculation conduit 34 is connected to the exhaust conduit 28 in an area of the exhaust conduit 28 located between the catalysts 30,32. The system 10 also includes a fuel vapor purge system, shown generally at 36, which is used for controlling the flow of air and purge vapor into the intake conduit 14.

Referring to FIGS. 2-6F, the EGR valve assembly 24 includes a first port, which in this embodiment is an exhaust gas inlet port 74 connected to the recirculation conduit 34, and the inlet port 74 is formed as part of a lower housing 76. The lower housing 76 is connected to a thermal isolator 38, and the thermal isolator 38 is connected to an upper housing 80. Formed as part of the lower housing 76 is an exhaust cavity 82, and in fluid communication with the exhaust cavity 82 is a second port, or outlet port 84. The outlet port 84 is connected to and in fluid communication with the intake conduit 14.

Disposed within the upper housing 80 is an actuator, which in this embodiment is a solenoid assembly, shown generally at 86, which is part of the EGR valve assembly 24. The solenoid assembly 86 is disposed within a cavity, shown generally at 88, formed as part of the upper housing 80. Also forming part of the cavity 88 is an outer wall portion 92 of the upper housing 80.

The solenoid assembly 86 includes a lower stator 94, where the lower stator 94 has a flange portion 42 which is in contact with a lip portion 98 formed as part of the upper housing 80. The flange portion 42 of the lower stator 94 is in contact with a bobbin 100, and a stator core 44 of the lower stator 94 is surrounded by the bobbin 100, best shown in FIGS. 2 and 4. The outer wall portion 92 forms part of the upper housing 80. The bobbin 100 is surrounded by a coil (not shown for demonstrative purposes), which is located in a cavity, shown generally at 102. There is an aperture 78 formed as part of the lower stator 94, and extending through the aperture 78 is a valve stem 40, and connected to the valve stem 40 is a moveable armature 54. The valve stem 40 extends through an aperture 46 formed as part of a stem shield 48, and the stem shield 48 is connected to a bushing 112, also having an aperture 112a, where the valve stem 40 also extends through the aperture 112a. The bushing 112 is connected to and partially surrounded by the thermal isolator 38, partially surrounded by the upper housing 80, and is in contact with the lower stator 94.

The armature 54 includes a large diameter magnetic portion 106 which extends into the solenoid assembly 86, and is partially surrounded by a bearing sleeve 90, and the bearing sleeve 90 is partially surrounded by an upper stator 166 and the bobbin 100. The large diameter magnetic portion 106 also includes a magnetic tapered section 108 which selectively moves towards and away from a stator cone 110 formed as part of the lower stator 94. Disposed between an outer flange portion 166A formed as part of the upper stator 166 and the bobbin 100 is an upper stator washer 170. There is a load spring 64 in contact with the upper stator washer 170, such that an end of the load spring 64 surrounds the outer flange portion 166A of the upper stator 166. The outer flange portion 166A is integrally formed with a central base portion 166B of the upper stator 166. The central base portion 166B of the upper stator 166 is partially surrounded by the bobbin 100, partially surrounded by the upper stator washer 170, and surrounds part of the bearing sleeve 90. The bearing sleeve 90 is in sliding contact with and is supported by the central base portion 166B, and the armature 54 is able to move relative to the central base portion 166B.

The armature 54 also includes a small diameter portion 116 which is integrally formed with the large diameter magnetic portion 106. The small diameter portion 116 is connected to a stopper cap 118. There is also a cap sleeve 117 surrounding the small diameter portion 116, and located between the stopper cap 118 and the indexing latch 56. The valve stem 40 is integrally formed with a valve member, shown generally at 120. The valve member 120 is selectively in contact with a valve seat 128, where the valve seat 128 is formed as part of an insert 124. The insert 124 is connected to the lower housing 76 through any suitable manner, such as a press-fit. The stopper cap 118, the armature 54, the valve stem 40 and valve member 120 move together as the valve member 120 is changed between an open position and a closed position. There is also a flange (not shown) which is located on a lip portion 174 formed as part of the outer wall portion 92. The contact between the magnetic tapered section 108 and the stator cone 110, and the contact between the valve member 120 and the valve seat 128 controls the travel of the valve member 120 between the open position and the closed position. The flange has an aperture through which the stopper cap 118 extends, and a flange portion 118A which is formed as part of the stopper cap 118.

Also disposed within the upper housing 80 is a latching mechanism, shown generally at 52 in FIGS. 4, 5A-5B, and 6A-6F. The latching mechanism 52 is used with the armature 54 to hold the valve member 120 in an open position even if the coil is not energized. The armature 54 is part of the solenoid assembly 86, and a current is applied to the coil to energize the coil, and move the armature 54 and the valve member 120 away from the valve seat 128.

Figure 4:
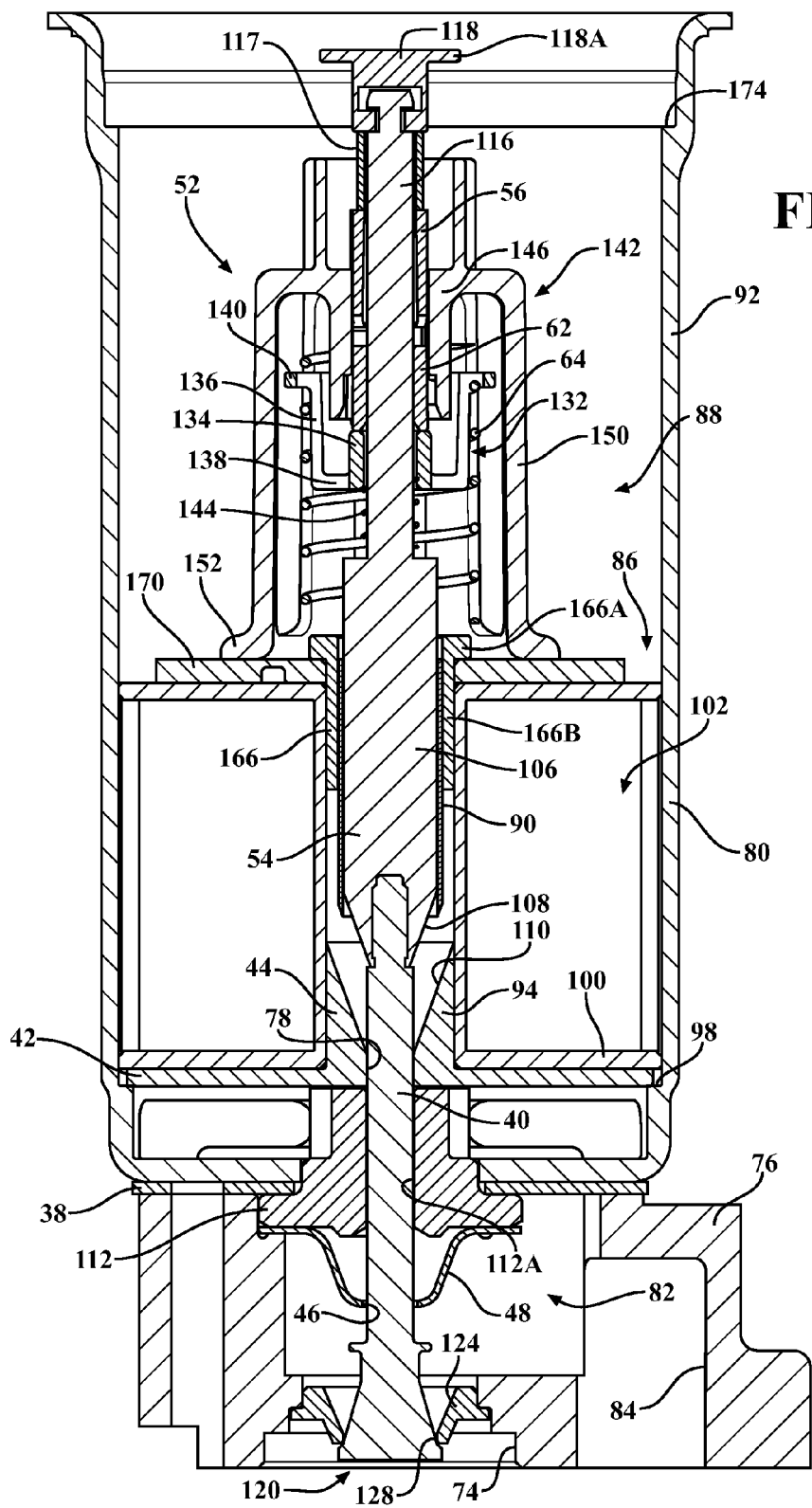
FIG. 4 is a sectional side view of a latching exhaust gas recirculation valve assembly, according to embodiments of the present invention.
Figure 5A:
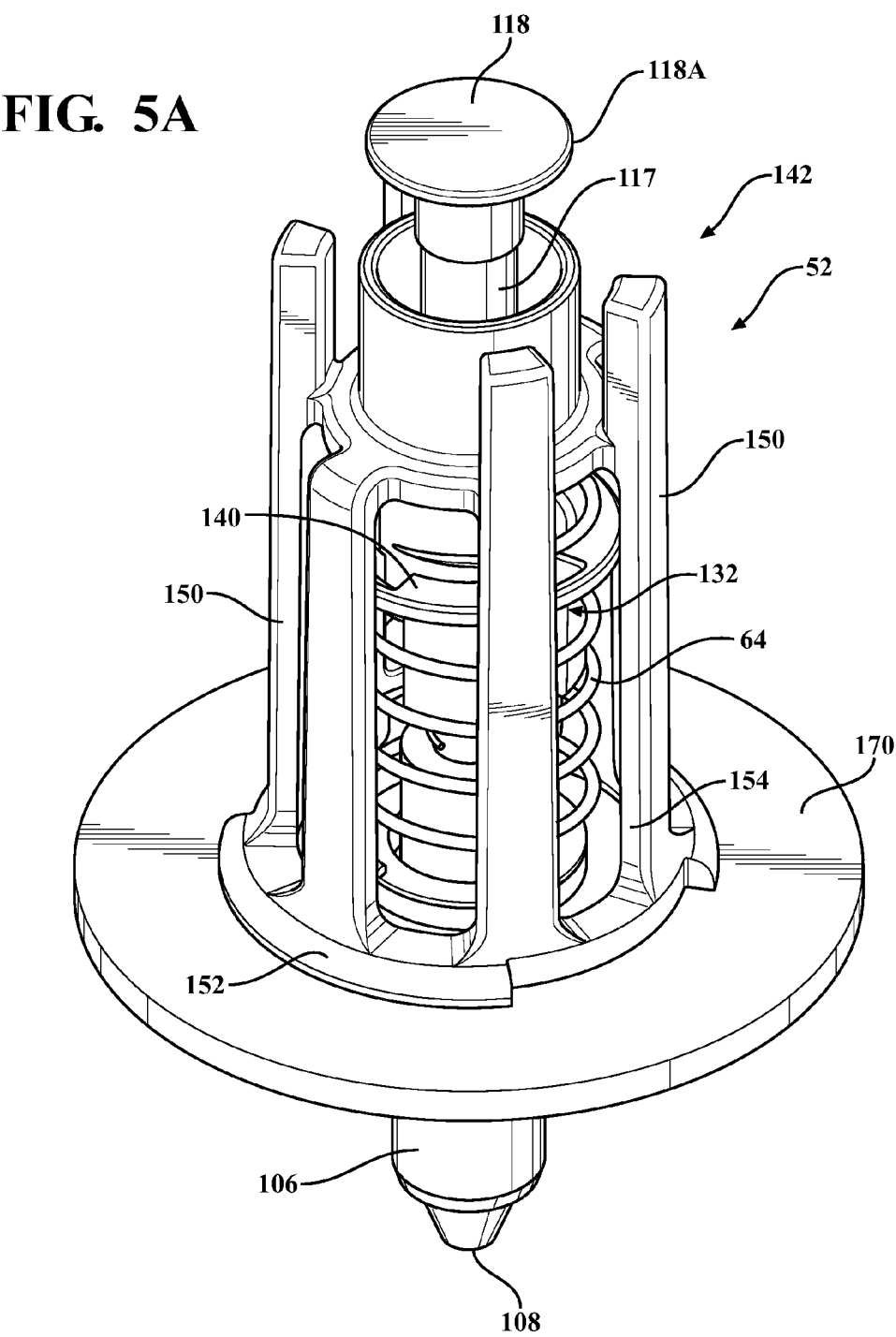
FIG. 5A is a perspective view of a latching mechanism, used as part of an exhaust gas recirculation valve assembly, according to embodiments of the present invention.
Figure 5B:
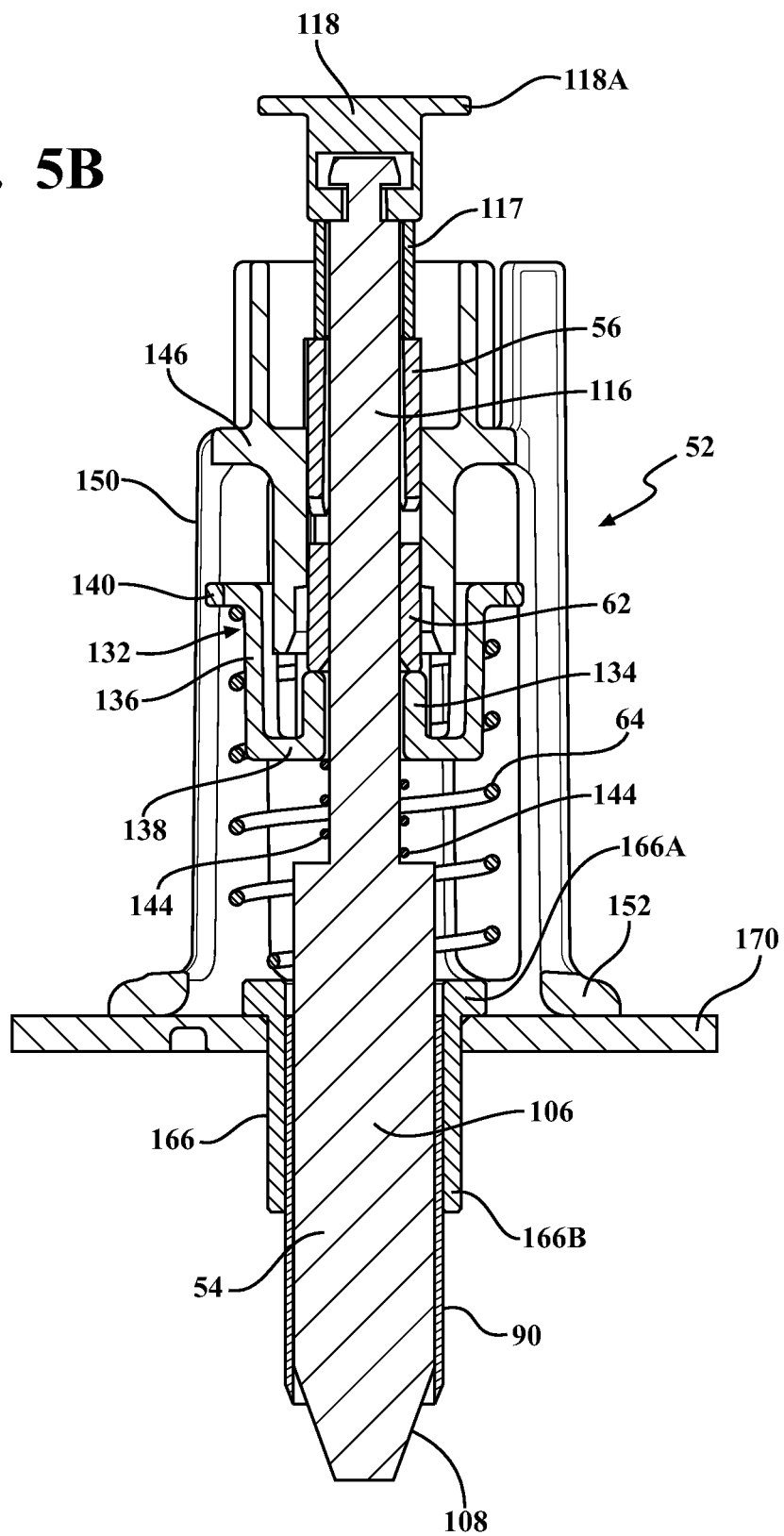
FIG. 5B is a perspective sectional view of a latching mechanism, used as part of an exhaust gas recirculation valve assembly, according to embodiments of the present invention.
Figure 6A:
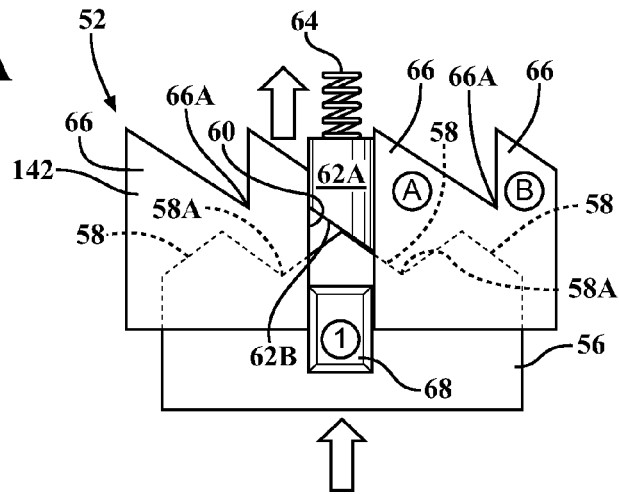
FIG. 6A is a diagram of a latching mechanism used as part of an exhaust gas recirculation valve assembly, where the latching mechanism is configured such that the indexing latch is fully retracted prior to actuation, and the exhaust gas recirculation valve assembly is in a closed position, according to embodiments of the present invention.

In FIGS. 4 and 6A, the valve member 120 is in a closed position. The mechanism 52 also includes an indexing latch 56 connected to the armature 54 such that the latch 56 moves with the armature 54, as shown in FIG. 4, and the latch 56 includes a first plurality of teeth 58 and several indexing splines 68. The mechanism 52 also includes several slots 60 formed as part of a guide 142, where the guide 142 also includes a second plurality of teeth 66. The mechanism 52 also includes an index mechanism 62 having at least one indexing tooth 62A (in this embodiment, the mechanism 62 has multiple teeth 62A, but only one is shown in FIGS. 6A-6F for demonstrative purposes), where the index mechanism 62 also surrounds the small diameter portion 116 of the armature 54, but is able to slide and move relative to the small diameter portion 116 of the armature 54. Force is applied to the index mechanism 62 by the load spring 64. The index mechanism 62 is also adjacent a spring cup, shown generally at 132. More specifically, the spring cup 132 includes an inner cylindrical portion 134 located next to the index mechanism 62. The inner cylindrical portion 134 also surrounds the small diameter portion 116, but is not connected to the small diameter portion 116 such that the spring cup 132 is also able to slide and move relative to the small diameter portion 116. The inner cylindrical portion 134 is connected to an outer cylindrical portion 136 with a central flange 138. Part of the load spring 64 surrounds the outer cylindrical portion 136 and is in contact with an outer flange 140 integrally formed with the outer cylindrical portion 136.

In addition to the load spring 64, there is also a return spring 144 which surrounds the small diameter portion 116, and is located between the spring cup 132 and the large diameter magnetic portion 106 of the armature 54. More specifically, the return spring 144 is between the inner cylindrical portion 134 of the spring cup 132 and the large diameter magnetic portion 106 of the armature 54, and the return spring 144 biases the spring cup 132 away from the large diameter magnetic portion 106 of the armature 54. The load spring 64 is between the outer flange 140 and the bobbin 100, and biases the spring cup 132 and the index mechanism 62 away from the bobbin 100. Depending on the configuration of the latching mechanism 52, the load spring 64 causes the spring cup 132 and index mechanism 62 to apply force to the latch 56 or the guide 142. Therefore, the latching mechanism 52 is biased in two different ways, one way is the return spring 144 biasing the spring cup 132 and the index mechanism 62 away from the large diameter magnetic portion 106 of the armature 54 (which is movable), and the other is the load spring 64 biasing the spring cup 132 and the index mechanism 62 away from the bobbin 100 (which is stationary).

In addition to the slots 60 and the teeth 66, the guide 142 also includes an inner housing 146 which partially surrounds the indexing latch 56 and the index mechanism 62. Part of the inner housing 146 is surrounded by the spring cup 132. The inner housing 146 is integrally formed with several support members 150, and the support members 150 are integrally formed with a circumferential flange member 152. There are apertures, shown generally at 154, between each of the support members 150. The circumferential flange member 152 is connected to the upper stator washer 170 through any suitable method, such as spot welding, use or an adhesive, or the like. The connection of the circumferential flange portion 152 to the upper stator washer 170 properly positions the guide 142.

The latching mechanism 52 functions to hold the valve member 120 in an open position, even when the coil is not energized. Referring to FIGS. 4 and 6A, the latching mechanism 52 is shown in a position which corresponds to the valve member 120 being in a closed position. When the coil is energized enough to generate a magnetic force to overcome the force from the springs 64,144, the armature 54 and the indexing latch 56 move toward the lower stator 94, moving the valve member 120 away from the valve seat 128, placing the valve member 120 in an open position. The movement of the armature 54 toward the lower stator 94 causes force to be applied to the teeth 62A of the index mechanism 62 from at least one of the first plurality of teeth 58 formed as part of the indexing latch 56. The movement of the indexing latch 56 is guided by the movement of the indexing splines 68 moving in the slots 60. The force applied to the index mechanism 62 from the indexing latch 56 overcomes the force applied to the index mechanism 62 from the springs 64,144 by way of the spring cup 132 and moves each tooth 62A of the index mechanism 62 out of a corresponding slot 60, as shown in FIG. 6B.

Figure 6B:
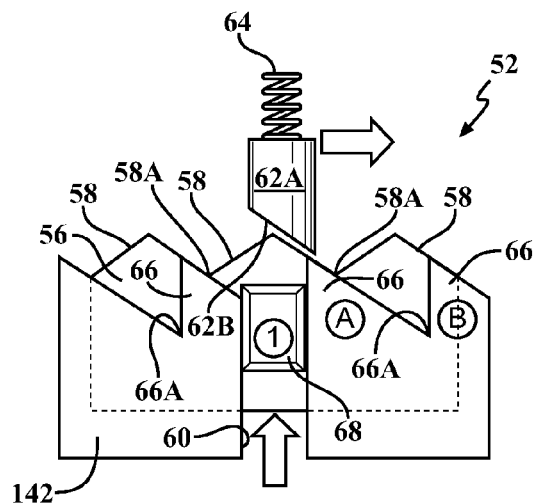
FIG. 6B is a diagram of a latching mechanism used as part of an exhaust gas recirculation valve assembly, where the latching mechanism is configured such that the indexing latch is partially extended as the exhaust gas recirculation valve assembly is moved to an open position, according to embodiments of the present invention.
Figure 6C:
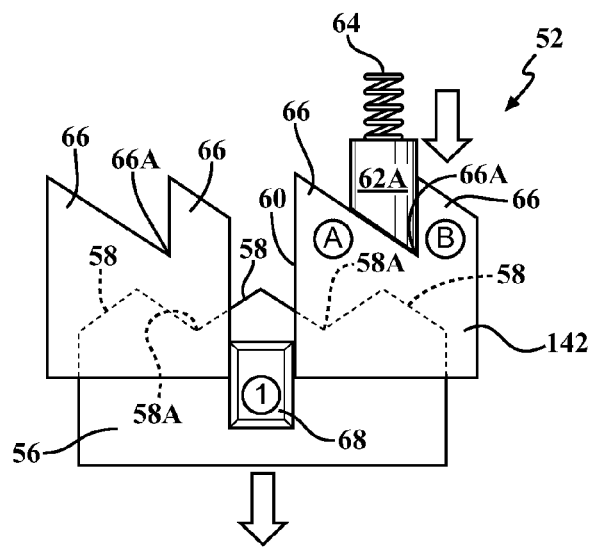
FIG. 6C is a diagram of a latching mechanism used as part of an exhaust gas recirculation valve assembly, where the latching mechanism is configured such that the indexing latch is fully retracted after actuation, and exhaust gas recirculation valve assembly is held in an open position, according to embodiments of the present invention.
Figure 6D:
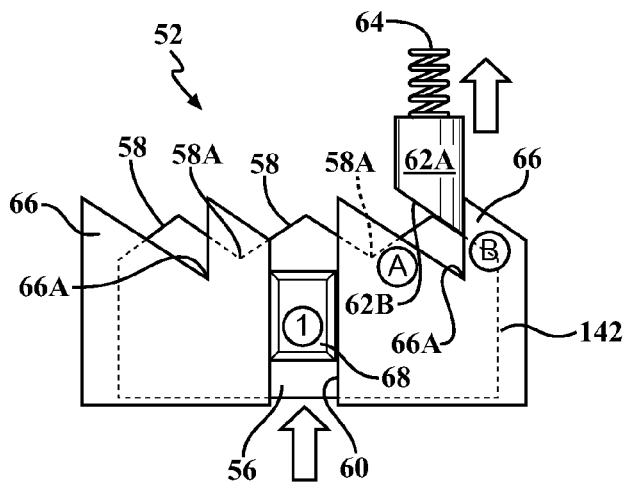
FIG. 6D is a diagram of a latching mechanism used as part of an exhaust gas recirculation valve assembly, where the latching mechanism is configured such that the indexing latch is partially extended as the exhaust gas recirculation valve assembly is being released from an open position, according to embodiments of the present invention.

It is shown in FIGS. 6A-6F that the vertexes 58A of the first plurality of teeth 58 are not in alignment with the vertexes 66A of the second plurality of teeth 66, which facilitates the rotation of the index mechanism 62. Each of the teeth 62A has an angled portion 62B which also facilitates the rotation of the index mechanism 62. The coil is energized to move the armature 54 and the indexing latch 56 toward the lower stator 94 enough to move the teeth 62A of index mechanism 62 out of the slots 60. Once the indexing latch 56 has moved the teeth 62A of the index mechanism 62 out of the slots 60, the pressure applied to the index mechanism 62 from the spring cup 132 and the load spring 64 and the return spring 144 pushes each tooth 62A towards a corresponding vertex 58A. This causes the index mechanism 62 to move (i.e., rotate about the small diameter portion 116 of the armature 54) as each tooth 62A slides towards one of the vertexes 58A in between two of the first plurality of teeth 58, as shown in FIG. 6B.

Once each tooth 62A is in contact with one of the vertexes 58A of the first plurality of teeth 58, each tooth 62A of the index mechanism 62 is also positioned such that each tooth 62A is between two of the second plurality of teeth 66 formed as part of the guide 142, also shown in FIG. 6B. The coil is then de-energized, but the valve member 120 remains in the open position because the index mechanism 62 (and therefore the spring cup 132 and armature 54) is held in place by the guide 142. More specifically, after the coil is de-energized, the indexing latch 56, moves away from the index mechanism 62 enough to allow the teeth 58 of the indexing latch 56 to disengage from the teeth 62A of the index mechanism 62, while at the same time, the force of the springs 64,144 causes the armature 54 to move a small amount away from the lower stator 94 such that the teeth 62A move toward the vertexes 66A of the second plurality of teeth 66 formed as part of the guide 142, as shown in FIG. 6C, again rotating the index mechanism 62. Since the guide 142 is stationary, and the teeth 62A of the index mechanism 62 are interlocked with the teeth 66 of the guide 142, the index mechanism 62, spring cup 132, and armature 54 are not allowed to move to place the valve member 120 back in the closed position, but rather are held in place by the guide 142 (and the teeth 58 of the indexing latch 56 are disengaged from the teeth 62A of the index mechanism 62), to maintain the valve member 120 in the open position. This allows the exhaust gas to flow from the recirculation conduit 34 through the EGR valve assembly 24 and into the intake conduit 14 as the valve member 120 is held in the open position, but does not draw any power from the vehicle battery to maintain the position of the valve member 120 in the open position since the coil is not energized.

Once the valve member 120 is in the open position (i.e., the valve member 120 is no longer in contact with the valve seat 128), the exhaust gas is able to flow through the first port 74 from the recirculation conduit 34, through the valve seat 128, and into the exhaust cavity 82. The exhaust gas then flows from the exhaust cavity 82 and out of the second port 84 into the intake conduit 14.

Figure 6E:
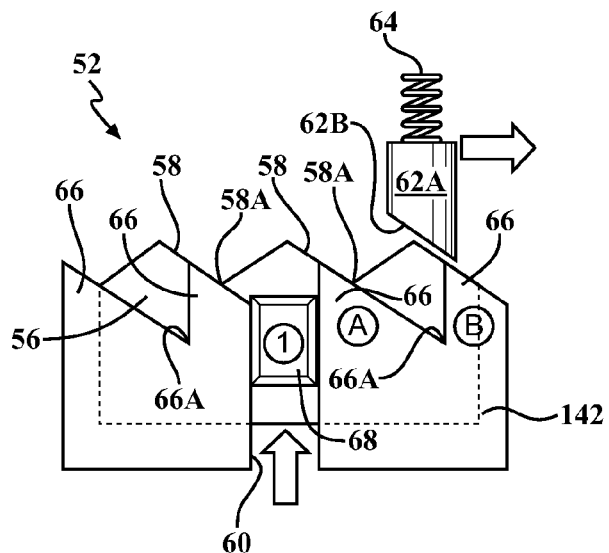
FIG. 6E is a diagram of a latching mechanism used as part of an exhaust gas recirculation valve assembly, where the latching mechanism is configured such that the indexing latch is fully extended as the exhaust gas recirculation valve assembly is being released from an open position, according to embodiments of the present invention.
Figure 6F:
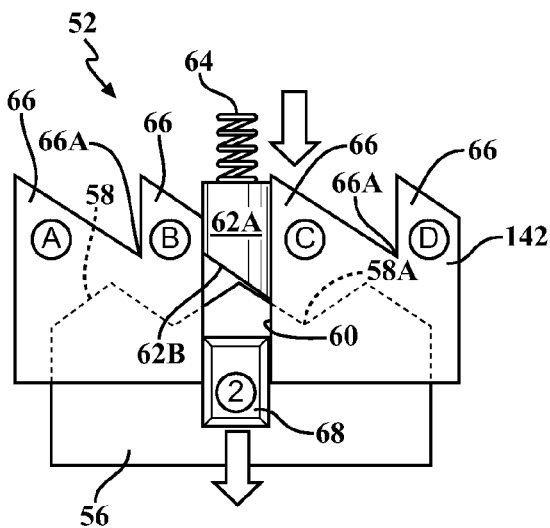
FIG. 6F is a diagram of a latching mechanism used as part of an exhaust gas recirculation valve assembly, where the latching mechanism is configured such that the indexing latch is fully retracted after actuation, and exhaust gas recirculation valve assembly is in a closed position, according to embodiments of the present invention.

Once it is desired to change the valve member 120 from the open position back to the closed position, the coil is again energized, moving the armature 54 and the indexing latch 56 toward the lower stator 94 such that the first plurality of teeth 58 again engage and apply force to the teeth 62A of the index mechanism 62 to overcome the force applied to the index mechanism 62 from the springs 64,144 and lift the index mechanism 62 away from the second plurality of teeth 66. As mentioned above, the vertexes 58A of the first plurality of teeth 58A are not in alignment with the vertexes 66A of the second plurality of teeth 66. When the valve member 120 is in the open position, and the teeth 62A of the index mechanism 62 are held in place by the teeth 66 of the guide 142, the teeth 62A of the index mechanism 62 are not in alignment with the vertexes 58A of the first plurality of teeth 58, shown in FIG. 6C. Once the teeth 62A of the index mechanism 62 have disengaged from the second plurality of teeth 66, and are only engaged with the first plurality of teeth 58, the teeth 62A move toward the corresponding vertexes 58A (because of the force from the springs 64,144), causing the index mechanism 62 to rotate, such that the teeth 62A are no longer in alignment with the vertexes 66A of the second plurality of teeth 66. The coil is then again de-energized, and the armature 54 and indexing latch 56 move away from the lower stator 94, and the teeth 62A reengage with the second plurality of teeth 66 of the guide 142, as shown in FIG. 6E. However, instead of moving towards the vertexes 66A due to the force of the springs 64,144, the each tooth 62A moves towards a corresponding slot 60, allowing the index mechanism 62 to move further away from the lower stator 94, and each tooth 62A to move into a corresponding slot 60, as shown in FIG. 6F, which also results in the force from the springs 64,144 moving the armature 54, indexing latch 56, index mechanism 62, and spring cup 132 further away from the lower stator 94, and the valve member 120 to move back to the closed position, as shown in FIGS. 4, 6A, and 6F.

Figure 3:
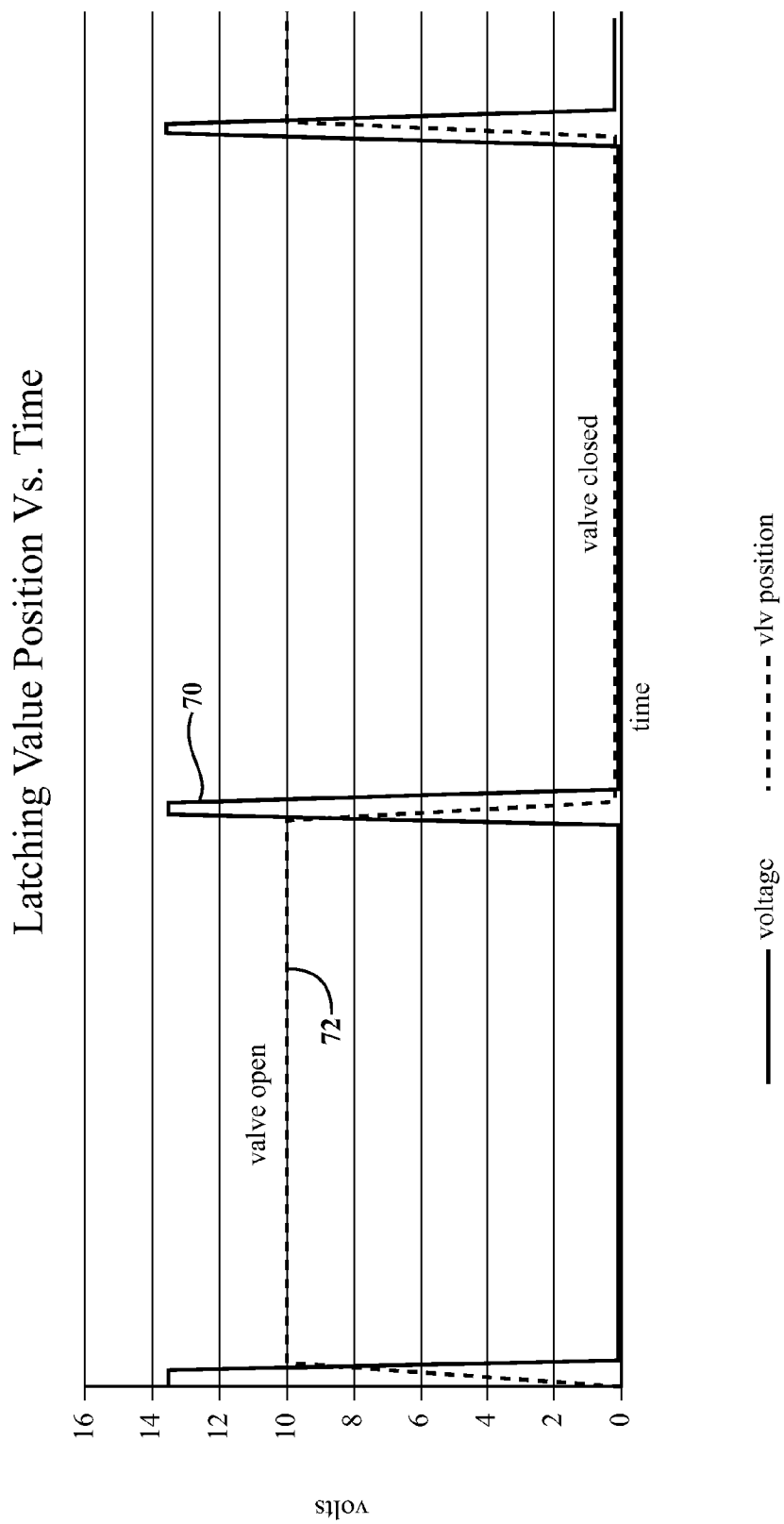
FIG. 3 is a graph depicting the voltage versus valve position of an exhaust gas recirculation valve assembly, according to embodiments of the present invention.

The solenoid assembly 86 and therefore the coil is only energized when the valve member 120 is being changed between the open position and the closed position. Once the valve member 120 is in the open position, the coil is de-energized. Furthermore, once the valve member 120 is in the closed position, the coil is de-energized. An example of this is shown in FIG. 3, where voltage 70 of the solenoid assembly 86 and the position 72 of the valve member 120 are shown. The voltage 70 is applied to the coil, and therefore the armature 54, as a single, short pulse, for about 30 milliseconds, the armature 54 moves the indexing latch 56 and the index mechanism 62, allowing the valve member 120 to change to the open position, as described above. Once the valve member 120 is in the open position, the coil is then de-energized, the voltage 70 then drops to zero, and the valve member 120 is held in the open position by the latching mechanism 52. The voltage 70 is then re-applied as a short, single pulse to the coil, which then re-energizes the coil, and the latching mechanism 52 is actuated to change the valve member 120 from the open position to the closed position. The function of the latching mechanism 52 allows to the coil of the solenoid assembly 86 to be de-energized, and therefore no power is drained from the battery of the vehicle, while still providing the capability of the valve member 120 to be held in the open position or closed position. Energy is only used in intervals of about 30 milliseconds when changing the valve member 120 between the open and closed positions, as shown in FIG. 3, and energy is not used when the valve member 120 is held in the open position or the closed position.

Figure 7D:
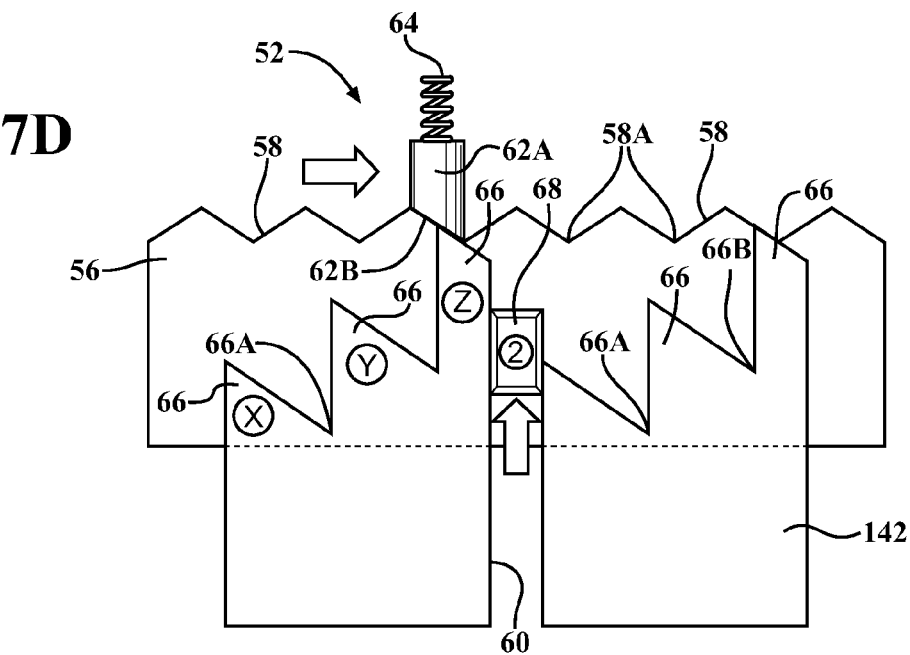
FIG. 7D is a diagram of a second embodiment of a latching mechanism used as part of an exhaust gas recirculation valve assembly, where the latching mechanism is configured such that the indexing latch is fully extended as the exhaust gas recirculation valve assembly is being released from one of a plurality of open positions, according to embodiments of the present invention.

Another embodiment of the EGR valve assembly 24 is shown in FIGS. 7A-7E, with like numbers referring to like elements. However, in this embodiment, the latching mechanism 52 is constructed to provide multiple open positions. The guide 142 includes teeth 66 which are different sizes and have vertexes 66A,B at varying distances from the valve seat 128, which allows for the latching mechanism 52 to be placed in multiple configurations, and the valve member 120 to be placed in multiple open positions, or to function as a multi-stage valve. The valve member 120 is in the closed position when the latching mechanism 52 is configured as shown in FIG. 7A. The coil is energized in the same manner as in the previous embodiment. When the coil is energized and then de-energized as previously described, the indexing teeth 62A of the index mechanism 62 change from being engaged with the teeth 58 of latch 56 shown in FIG. 7A to being engaged with the teeth 66 of the guide 142, placing the latching mechanism 52 in a first configuration, as shown in FIG. 7B, and placing the valve member 120 in a first open position. More specifically, the tooth 62A shown in FIG. 7B is engaged with the first vertex 66A of the guide. When it is desired to change the valve member 102 to a second open position, the coil is again energized and de-energized as described in the previous embodiment, changing the location of the indexing teeth 62A from being engaged with the first vertex 66A of the guide 142, as shown in FIG. 7B, to being engaged with the second vertex 66B of the guide 142, placing the latching mechanism 52 in a second configuration, as shown in FIG. 7C. When the teeth 62A are engaged with the second vertex 66B, the valve member 120 is then placed in the second open position.

In the embodiment shown in FIGS. 7A-7E, a portion of the teeth 66 have vertexes 66A which are located at a first distance from the valve seat 128, and another portion of the teeth 66 have vertexes 66B which are located at a second distance from the valve seat 128. The second distance is less than the first distance from the valve seat 128, and therefore a greater amount of exhaust gas is able to flow from the recirculation conduit 34 to the intake conduit 14 when the valve member 120 is in one of the open positions.

Figure 7E:
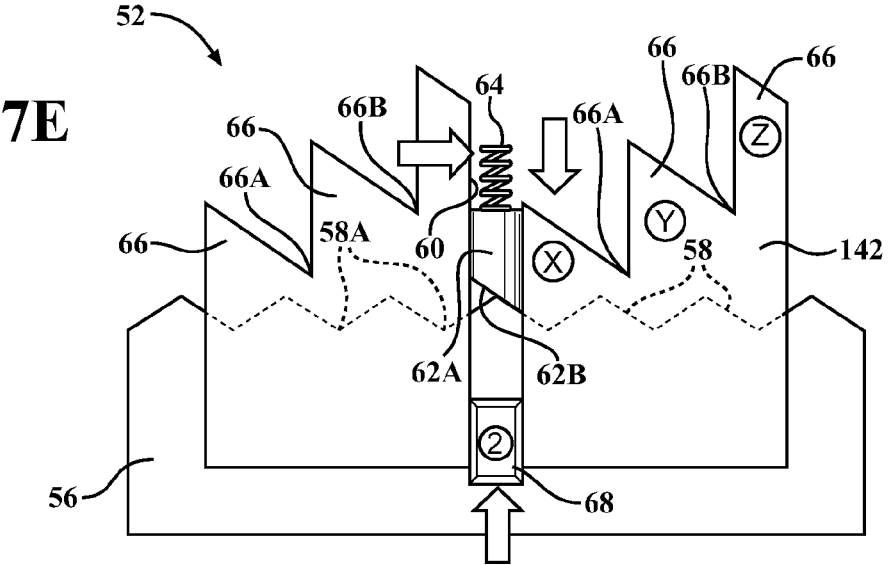
FIG. 7E is a diagram of a second embodiment of a latching mechanism used as part of an exhaust gas recirculation valve assembly, where the latching mechanism is configured such that the indexing latch is fully retracted and the after actuation, and the exhaust gas recirculation valve assembly is in the closed position, according to embodiments of the present invention.

When it is desired to place the valve member 120 back in the closed position, the coil 120 is then energized and de-energized as described in the previous embodiment, and the tooth 62A changed from being engaged with the second vertex 66B, shown in FIG. 7C, to being located in the slot 60, as shown in FIG. 7E. The tooth 62A is shown transitioning between the vertex 66B and the slot 60 in FIG. 7D.

Yet another embodiment of the present invention is shown in FIGS. 8A-8F. In this embodiment, the latching mechanism 52 is also constructed to have multiple open positions, but is also able to place the valve member 120 in the closed position in between each open position.

Figure 8A:
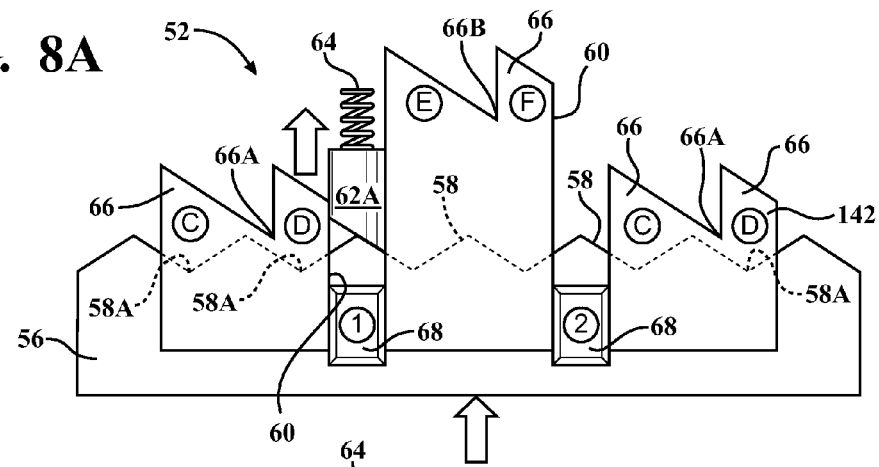
FIG. 8A is a diagram of a third embodiment of a latching mechanism used as part of an exhaust gas recirculation valve assembly, where latching mechanism is configured such that the indexing latch is fully retracted prior to actuation, and the exhaust gas recirculation valve assembly is in a closed position, according to embodiments of the present invention.
Figure 8B:
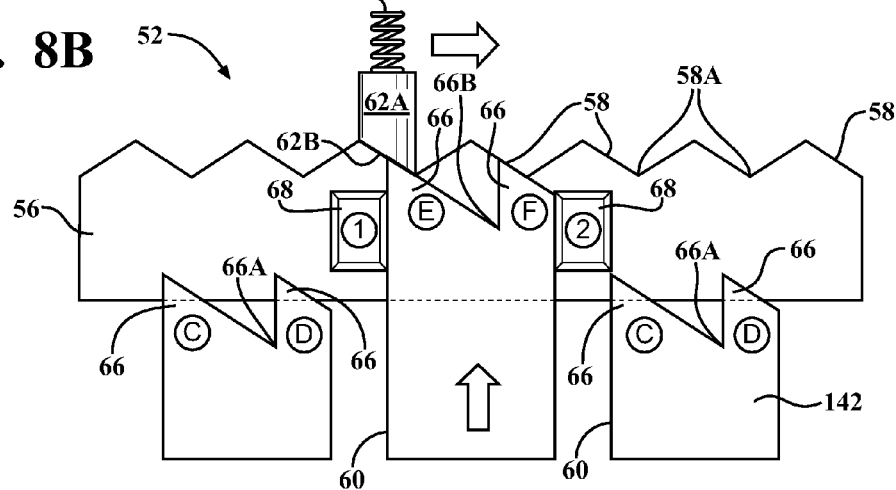
FIG. 8B is a diagram of a third embodiment of a latching mechanism used as part of an exhaust gas recirculation valve assembly, where the latching mechanism is configured such that the indexing latch is fully extended as the exhaust gas recirculation valve assembly is moved to one of a plurality of open positions, according to embodiments of the present invention.
Figure 8C:
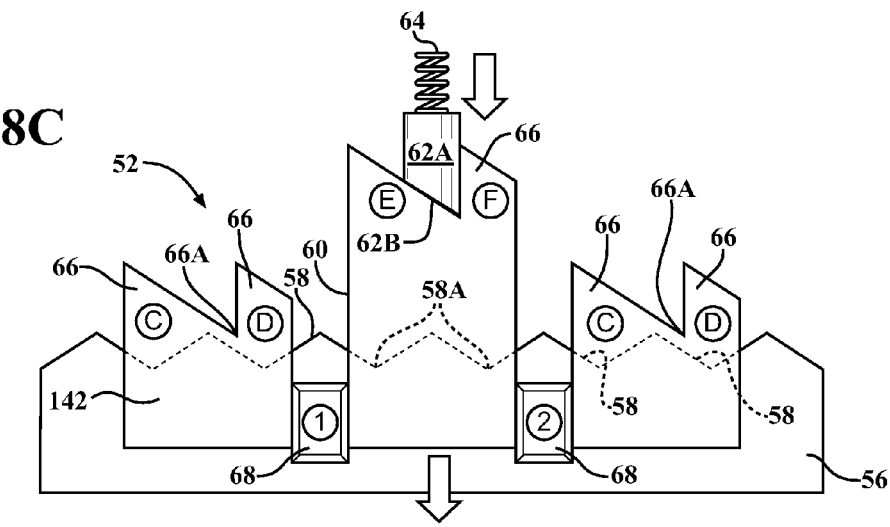
FIG. 8C is a diagram of a third embodiment of a latching mechanism used as part of an exhaust gas recirculation valve assembly, where the latching mechanism is configured such that the indexing latch is fully retracted and the exhaust gas recirculation valve assembly is held in a first of a plurality of open positions, according to embodiments of the present invention.

The coil is again energized in the same manner as in the previous embodiments. The valve member 120 is in the closed position when the latching mechanism 52 is configured as shown in FIG. 8A. When the coil is energized, the indexing latch 56 moves towards the lower stator 94, moving the tooth 62A out of the slot 60, as shown in FIG. 8B, and the index mechanism 62 rotates such that each tooth 62A moves to a corresponding vertex 58A of the teeth 58, as previously described, such that when the coil is de-energized, the latch 56 moves away from the lower stator 94 such that each tooth 62A engages with a corresponding tooth 66 of the guide 142, which causes the index mechanism 62 to rotate further, and each tooth 62A to move towards and engage a corresponding vertex 62B, placing the latching mechanism 52 in a second configuration and the valve member 120 in one of the open positions, as shown in FIG. 8C.

Figure 8D:
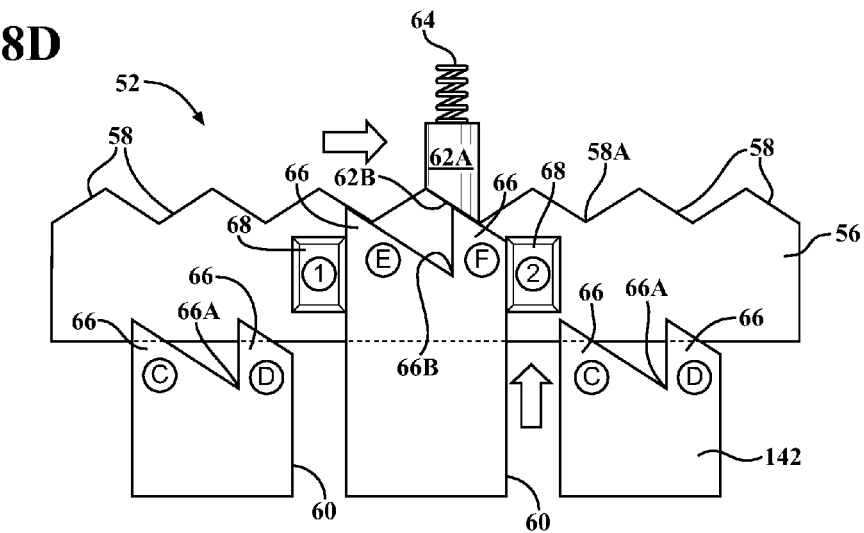
FIG. 8D is a diagram of a third embodiment of a latching mechanism used as part of an exhaust gas recirculation valve assembly, where the latching mechanism is configured such that the indexing latch is fully extended as the exhaust gas recirculation valve assembly is being released from one of a plurality of open positions, according to embodiments of the present invention.
Figure 8E:
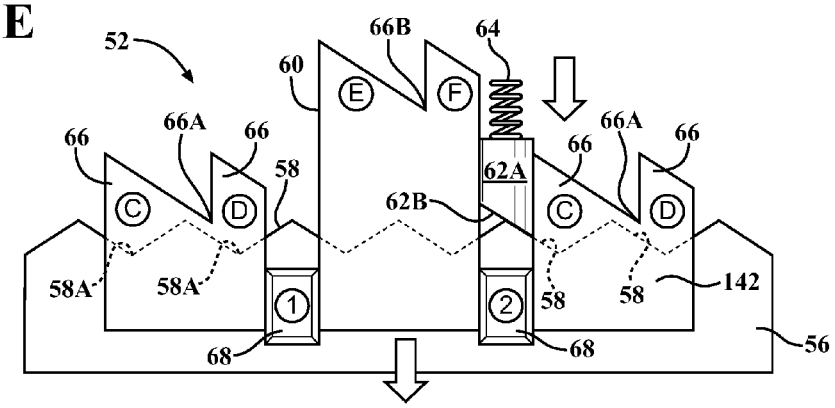
FIG. 8E is a diagram of a third embodiment of a latching mechanism used as part of an exhaust gas recirculation valve assembly, where the latching mechanism is configured such that the indexing latch is fully retracted after actuation, and the exhaust gas recirculation valve assembly is in a closed position, according to embodiments of the present invention.
Figure 8F:
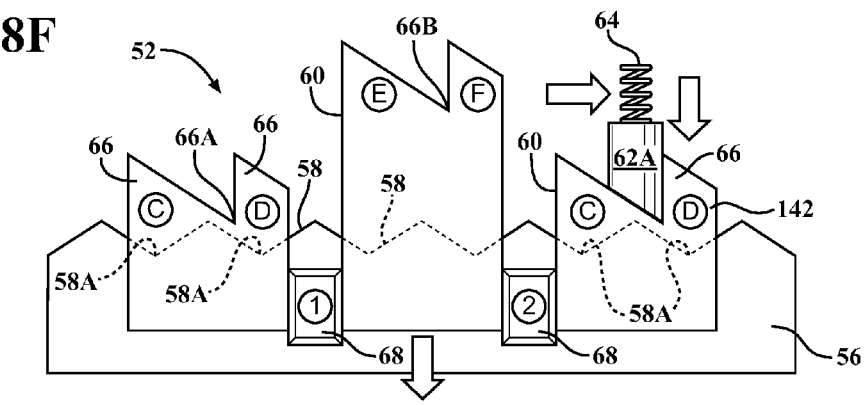
FIG. 8F is a diagram of a third embodiment of a latching mechanism used as part of an exhaust gas recirculation valve assembly, where the latching mechanism is configured such that the indexing latch is fully retracted, and the exhaust gas recirculation valve assembly is in a second of a plurality of open positions, according to embodiments of the present invention.

The coil is then energized to actuate the latching mechanism 52 as shown in FIG. 8D to transition the valve member 120 between one of the plurality of open positions and the closed position, and then de-energized to configure the latching mechanism 52 such that each tooth 62A moves into a corresponding slot 60, as shown in FIG. 8E, and the valve member 120 is back in the closed position. This process is repeated to change the valve member 120 from the closed position shown in FIG. 8E to another open position, shown in FIG. 8F, where the latching mechanism 52 is in a first configuration, and each tooth 62A is engaged with a corresponding vertex 66A. It is therefore shown in FIGS. 8A-8F that the valve member 120 is able to be placed in multiple open positions, and placed in a closed position in between each of the open positions. Again, the vertexes 66A of the teeth 66 are located at a first distance from the valve seat 128, and the vertexes 66B of the teeth 66 are located at a second distance from the valve seat 128. The second distance is less than the first distance, and therefore a greater amount of exhaust gas is able to flow from the recirculation conduit 34 to the intake conduit 14 when the valve member 120 is in the larger of the open positions, and each tooth 62A is engaged with a vertex 66B. However, the valve member 120 is placed in the closed position in between the open positions.

Another feature of the present invention is that in all of the embodiments above, the coil may be held energized at full extend, such that the valve member 120 is the furthest away from the valve seat 128, maintaining a maximum open position, in effect creating additional flow capability of the valve assembly 24. A secondary pulsed signal (i.e., PWM signal) effectually holds the valve member 120 in the maximum open state with reduced power consumption after being energized (i.e., a peak-and-hold signal). In all of the embodiments, the position of the valve member 120 is changed to control the flow of exhaust gas from through the first port 74 from the recirculation conduit 34, through the valve seat 128, into the exhaust cavity 82, and out of the second port 84 into the intake conduit 14.

Another feature of the present invention is the ability to detect the position of the valve assembly 24, and more specifically the position of the valve member 120, by detecting the current applied to the coil. This feature is also described in U.S. patent application Ser. No. 14/708,354, the entire specification of which is incorporated herein by reference.

The position of the armature 54, and therefore the valve member 120 is detected by measuring current. The change in current is measured by emitting a 12 Volt pulse through the coil. In one embodiment, the voltage pulse typically lasts between 5-15 milliseconds, and is therefore not long enough, or strong enough, to move the armature 54, but is significant enough to cause a change in current in the coil that is measurable. It should be noted that it is within the scope of the invention that the voltage pulse used to detect the position of the valve member 120 may last for longer or shorter time intervals, as long as the armature 54 and valve member 120 remain stationary. Because the change in current in the coil is measured, and the level of current change depends on the location of the armature 54 and corresponds to the location of the valve member 120 and the armature 54, the location of the valve member 120 and the armature 54 is therefore detected and used to identify the position of the latching mechanism 52.

In this embodiment, the current of the coil is measured when the valve member 120 is in either one of the open positions or the closed position, and is stationary (i.e., not transitioning between one of the open positions and closed position). In this embodiment, a 12 Volt pulse is emitted through the coil, and a measurement of the current of the coil is then taken. The current of the coil changes, depending upon the location of the armature 54.

The position of the valve member 120 is able to be detected when the valve member 120 is in either one of the open position or the closed position. To detect the position of the valve member 120 and the armature 54, a voltage pulse is sent across a sense resistor (not shown), and into the coil of the solenoid assembly 86. The voltage pulse is not large enough or long enough to move the armature 54, but creates a voltage across the sense resistor that is measured, which then corresponds to the current flowing through the sense resistor. This value of the current varies depending on the location of the armature 54, and valve member 120. Although in this embodiment, a sense resistor is used to detect the position of the valve member 120 and armature 54, it is within the scope of the invention that other electrical components in circuits having different configurations may be used.

The peak current measurement taken during a first voltage pulse is compared to the peak current measurement taken during a second voltage pulse. The higher of the two current measurements indicates that the armature 54 and valve member 120 are in the closed position, and the lower of the two current measurements indicates that the armature 54 and valve member 120 are in the closed position. In the embodiments shown in FIGS. 7A-7E and FIGS. 8A-8F, there are different current measurements that correspond to the multiple open positions of the valve member 120. The higher the current measurement, the further open the valve member 120.

Additionally, the voltage pulse being applied for different lengths of time produces different current measurements, which also depends on whether the valve member 120 is in the open position or closed position. The current measurement, and therefore the position of the valve member 120 and armature 54, is therefore detected by measuring the current in the coil after applying the voltage pulse to the coil for a specified time period. The specified time period of the voltage pulse may be any desired time period, as long as the valve member 120 and armature 54 remain stationary during the application of the voltage pulse.

Although the present invention is shown as being used with an exhaust gas recirculation system 10, it is within the scope of the invention that the valve assembly 24 may be configured for use with other applications requiring a latching valve which may be deactivated when in open or closed positions. Such other applications may include, but are not limited to, fuel vapor purge systems, air intake valves for fuel cell powered vehicles, and the like.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   a valve assembly, including:
      an actuator;
      a latching mechanism controlled by the actuator;
      a valve member connected to the latching mechanism;
      a valve seat, the valve member selectively in contact with the valve seat;
      an index mechanism;
      a guide selectively engaged with the index mechanism, the index mechanism is disengaged from the guide with the valve member is in contact with the valve seat and in the closed position, the index mechanism is engaged with the guide in a first configuration when the valve member is moved away from the valve seat and in a first of the plurality of open positions, and in a second configuration when the valve member is moved further away from the valve seat and in a second of the plurality of open positions;
      a plurality of teeth formed as part of the guide;
      a plurality of vertexes, each one of the plurality of vertexes located in between two of the plurality of teeth, and the plurality of teeth are configured such that a first portion of the plurality of vertexes are located at a first distance from the valve seat, and a second portion of the plurality of vertexes are located at a second distance from the valve seat such that the index mechanism is engaged with the first portion of the plurality of vertexes when the valve member is in the first of the plurality of open positions, and the index mechanism is engaged with the second portion of the plurality of vertexes when the valve member is in the second of the plurality of open positions; and
      an indexing latch connected to an armature, the armature being part of the actuator and connected to the valve member, and the index mechanism surrounds a portion of the armature such that the index mechanism moves relative to the armature, and the index mechanism is selectively engaged with the indexing latch;
   wherein the actuator configures the latching mechanism such that the latching mechanism places the valve member in a closed position where the valve member is in contact with the valve seat, or the actuator configures the latching mechanism such that the latching mechanism places the valve member in one of a plurality of open positions, where the valve member is moved away from the valve seat.

2. The apparatus of claim 1, further comprising:
   a load spring biasing the index mechanism away from the valve seat; and
   a return spring substantially surrounding part of the armature such that the return spring is in contact with part of the armature, the return spring biasing the index mechanism away from the valve seat;
   wherein the actuator is activated to move the armature and the valve member against the force of the load spring and the return spring, and the valve member away from the valve seat, when the valve is in the closed position.

3. The apparatus of claim 1, further comprising:
   a plurality of teeth formed as part of the indexing latch;
   a plurality of slots formed as part of the guide; and
   a plurality of indexing teeth formed as part of the index mechanism;
   wherein each of the plurality of indexing teeth are disposed in a corresponding one of the plurality of slots and engaged with the plurality of teeth of the indexing latch when the valve is in the closed position, and the plurality of indexing teeth are removed from the plurality of slots, disengaged from the plurality of teeth of the indexing latch, and engaged with the plurality of teeth of the guide when the valve member is in the open position.

4. The apparatus of claim 1, further comprising:
an upper housing having a cavity, the actuator and the latching mechanism located in the cavity of the upper housing;
a lower housing connected to the upper housing, the lower housing having an exhaust cavity, the valve seat formed as part of the lower housing;
an exhaust recirculation conduit in fluid communication with the exhaust cavity of the lower housing; and
an intake conduit in fluid communication with the exhaust cavity of the lower housing;
wherein the valve member is changed between the closed position and one of the plurality of open positions to control the flow of exhaust gas between the exhaust recirculation conduit and the intake conduit.

5. The apparatus of claim 1, wherein the indexing latch is engaged with the index mechanism when the valve is in the closed position, and when the actuator is activated, the armature moves the indexing latch and valve, causing the indexing latch to engage with and move the index mechanism such that the index mechanism rotates about the armature, and when the actuator is deactivated, the index mechanism engages with the plurality of teeth, further rotates about the armature and engages with a first portion of the vertexes, and the indexing latch disengages from the index mechanism, placing the valve in a first of the plurality of open positions.

6. The apparatus of claim 5, wherein the actuator is again activated when the valve is in the first of the plurality of open positions, such that the armature again moves the indexing latch and valve, causing the indexing latch to engage with and move the index mechanism such that the index mechanism disengages from the guide and rotates about the armature, and when the actuator is deactivated, the indexing latch reengages with the plurality of teeth such that the index mechanism further rotates about the armature and engages with a second portion of the vertexes, and the index latch disengages from the index mechanism, placing the valve in a second of the plurality of open positions.

7. The apparatus of claim 6, wherein the actuator is again activated when the valve is in the second of the plurality of open positions, such that the armature again moves the indexing latch and valve, causing the indexing latch to engage with and move the index mechanism such that the index mechanism disengages from the second portion of the plurality of vertexes and rotates about the armature, and when the actuator is deactivated, the indexing latch and the index mechanism moves such that the valve member is placed back in the closed position.

8. The apparatus of claim 5, wherein the actuator is again activated when the valve is in the first of the plurality of open positions, such that the armature again moves the indexing latch and valve, causing the indexing latch to engage with and move the index mechanism such that the index mechanism disengages from the first portion of the plurality of vertexes and rotates about the armature, and when the actuator is deactivated, the indexing latch and the index mechanism moves such that the valve member is placed back in the closed position.

9. The apparatus of claim 8, wherein the actuator is again activated when the valve is in the closed position, such that the armature again moves the indexing latch and valve, causing the indexing latch to engage with and move the index mechanism such that the index mechanism rotates about the armature, and when the actuator is deactivated, the index mechanism engages with the plurality of teeth, further rotates about the armature and engages with a second portion of the vertexes, and the indexing latch disengages from the index mechanism, placing the valve in a second of the plurality of open positions.

10. A valve assembly, including:
an actuator;
a latching mechanism controlled by the actuator;
an index mechanism being part of the latching mechanism;
a guide selectively engaged with the index mechanism, the guide being part of the latching mechanism;
a valve member;
a valve seat, the valve member selectively in contact with the valve seat;
an indexing latch connected to the actuator;
a first plurality of teeth formed as part of the indexing latch;
a second plurality of teeth formed as part of the guide;
a plurality of vertexes, each one of the plurality of vertexes located in between two of the second plurality of teeth; and
a plurality of indexing teeth formed as part of the index mechanism, the first plurality of teeth being engaged with the indexing teeth when the valve member is in the closed position, and the second plurality of teeth are configured such that a portion of the plurality of vertexes are located at a first distance from the valve seat, and a second portion of the plurality of vertexes are located at a second distance from the valve seat such that each one of the plurality of indexing teeth is engaged with a corresponding one of the first portion of the plurality of vertexes when the valve member is in the first of the plurality of open positions, and each one of the plurality of indexing teeth is engaged with a corresponding one of the second portion of the plurality of vertexes when the valve member is in the second of the plurality of open positions;
wherein the latching mechanism places the valve member in a closed position such that the valve member is in contact with the valve seat and the index mechanism is disengaged from the guide, and the latching mechanism places the valve member in one of a plurality of open positions, where the valve member is moved away from the valve seat and the index mechanism is engaged with the guide.

11. The valve assembly of claim 10, wherein the index mechanism is engaged with the guide in a first configuration when the valve member is moved away from the valve seat and in a first of the plurality of open positions, and in a second configuration when the valve member is moved further away from the valve seat and in a second of the plurality of open positions.

12. The valve assembly of claim 10, further comprising:
a plurality of slots formed as part of the guide; and
wherein each of the plurality of indexing teeth are disposed in a corresponding one of the plurality of slots and engaged with the first plurality of teeth when the valve is in the closed position, and the plurality of indexing teeth are removed from the plurality of slots, and disengaged from the first plurality of teeth when the valve is in one of the plurality of open positions.

13. The valve assembly of claim 10, further comprising:
a load spring biasing the index mechanism away from the valve seat; and a return spring substantially surrounding part of the armature such that the return spring is in contact with part of the armature, the return spring biasing the index mechanism away from the valve seat;

wherein the actuator is activated to move the armature and the valve member against the force of the load spring and the return spring, and the valve member away from the valve seat, when the valve is in the closed position.

14. The valve assembly of claim 10, further comprising:
an upper housing having a cavity, the actuator and the latching mechanism located in the cavity of the upper housing;
a lower housing connected to the upper housing, the lower housing having an exhaust cavity, the valve seat formed as part of the lower housing;
an exhaust recirculation conduit in fluid communication with the exhaust cavity of the lower housing; and
an intake conduit in fluid communication with the exhaust cavity of the lower housing;
wherein the valve member is changed between the closed position and one of the plurality of open positions to control the flow of exhaust gas between the exhaust recirculation conduit and the intake conduit.

15. The valve assembly of claim 10, the latching mechanism further comprising:
an armature connected to the indexing latch;
wherein the armature is connected to the valve member, and the index mechanism surrounds a portion of the armature such that the index mechanism moves relative to the armature, and the index mechanism is selectively engaged with the indexing latch.

16. The valve assembly of claim 15, wherein the indexing latch is engaged with the index mechanism when the valve is in the closed position, and when the actuator is activated, the armature moves the indexing latch and valve, causing the indexing latch to engage with and move the index mechanism such that the index mechanism rotates about the armature, and when the actuator is deactivated, the index mechanism engages with the plurality of teeth, further rotates about the armature and engages with a first portion of the vertexes, and the indexing latch disengages from the index mechanism, placing the valve in a first of the plurality of open positions.

17. The valve assembly of claim 16, wherein the actuator is again activated when the valve is in the first of the plurality of open positions, such that the armature again moves the indexing latch and valve, causing the indexing latch to engage with and move the index mechanism such that the index mechanism disengages from the guide and rotates about the armature, and when the actuator is deactivated, the indexing latch reengages with the plurality of teeth such that the index mechanism further rotates about the armature and engages with a second portion of the vertexes, and the index latch disengages from the index mechanism, placing the valve in a second of the plurality of open positions.

18. The valve assembly of claim 17, wherein the actuator is again activated when the valve is in the second of the plurality of open positions, such that the armature again moves the indexing latch and valve, causing the indexing latch to engage with and move the index mechanism such that the index mechanism disengages from the second position of the plurality of vertexes and rotates about the armature, and when the actuator is deactivated, the indexing latch and the index mechanism moves such that the valve member is placed back in the closed position.

19. The valve assembly of claim 16, wherein the actuator is again activated when the valve is in the first of the plurality of open positions, such that the armature again moves the indexing latch and valve, causing the indexing latch to engage with and move the index mechanism such that the index mechanism disengages from the first portion of the plurality of vertexes and rotates about the armature, and when the actuator is deactivated, the indexing latch and the index mechanism moves such that the valve member is placed back in the closed position.

20. The valve assembly of claim 19, wherein the actuator is again activated when the valve is in the closed position, such that the armature again moves the indexing latch and valve, causing the indexing latch to engage with and move the index mechanism such that the index mechanism rotates about the armature, and when the actuator is deactivated, the index mechanism engages with the plurality of teeth, further rotates about the armature and engages with a second portion of the vertexes, and the indexing latch disengages from the index mechanism, placing the valve in a second of the plurality of open positions.

21. A valve assembly, comprising:
an upper housing;
a cavity formed as part of the upper housing;
a lower housing;
an exhaust cavity formed as part of the lower housing;
an actuator disposed in the cavity of the upper housing;
a latching mechanism disposed in the cavity of the upper housing;
an index mechanism being part of the latching mechanism;
a guide selectively engaged with the index mechanism, the guide being part of the latching mechanism;
a valve seat located in the lower housing and in fluid communication with the exhaust cavity formed as part of the lower housing;
a valve member connected to and controlled by the actuator, the valve member selectively in contact with the valve seat;
an indexing latch connected to the actuator;
a first plurality of teeth formed as part of the indexing latch;
a second plurality of teeth formed as part of the guide;
a plurality of vertexes, each one of the plurality of vertexes located in between two of the second plurality of teeth; and
a plurality of indexing teeth formed as part of the index mechanism, the first plurality of teeth being engaged with the indexing teeth when the valve member is in the closed position, and the second plurality of teeth are configured such that a first portion of the plurality of vertexes are located at a first distance from the valve seat, and a second portion of the plurality of vertexes are located at a second distance from the valve seat such that each one of the plurality of indexing teeth is engaged with a corresponding one of the first portion of the plurality of vertexes when the valve member is in the first of the plurality of open positions, and each one of the plurality of indexing teeth is engaged with a corresponding one of the second portion of the plurality of vertexes when the valve member is in the second of the plurality of open positions;
wherein the latching mechanism places the valve member in a closed position such that the valve member is in contact with the valve seat and the index mechanism is disengaged from the guide, preventing exhaust gas from flowing through the exhaust cavity of the lower housing, and the latching mechanism places the valve member in one of a plurality of open positions, where the valve member is moved away from the valve seat and the index mechanism is engaged with the guide, allowing exhaust gas to flow through the exhaust cavity of the lower housing.

22. The valve assembly of claim 21, further comprising:
a plurality of slots formed as part of the guide; and
wherein each of the plurality of indexing teeth are disposed in a corresponding one of the plurality of slots and engaged with the first plurality of teeth when the valve is in the closed position, and the plurality of indexing teeth are removed from the plurality of slots, and disengaged from the first plurality of teeth when the valve is in one of the plurality of open positions.

23. The valve assembly of claim 21, further comprising:
a load spring biasing the index mechanism away from the valve seat; and
a return spring substantially surrounding part of the armature such that the return spring is in contact with part of the armature, the return spring biasing the index mechanism away from the valve seat;
wherein the actuator is activated to move the armature and the valve member against the force of the load spring and the return spring, and the valve member away from the valve seat, when the valve is in the closed position.

24. The valve assembly of claim 21, further comprising:
an exhaust recirculation conduit in fluid communication with the exhaust cavity formed as part of the lower housing; and
an intake conduit in fluid communication with the exhaust cavity formed as part of the lower housing;
wherein the valve member is changed between the closed position and one of the plurality of open positions to control the flow of exhaust gas through the exhaust cavity formed as part of the lower housing.

25. The valve assembly of claim 21, wherein the first plurality of teeth are engaged with the indexing teeth when the valve is in the closed position, and when the actuator is activated, the armature moves the indexing latch and valve, causing the first plurality of teeth to engage with the indexing teeth and move the index mechanism such that the index mechanism rotates about the armature, and when the actuator is deactivated, the first plurality of teeth engage with the second plurality of teeth, further rotating the index mechanism about the armature and engaging the indexing teeth with a first portion of the vertexes, and the indexing latch disengages from the first plurality of teeth, placing the valve in a first of the plurality of open positions.

26. The valve assembly of claim 25, wherein the actuator is again activated when the valve is in the first of the plurality of open positions, such that the armature again moves the indexing latch and valve, causing the first plurality of teeth to engage with the indexing teeth and move the index mechanism such that the index mechanism disengages from the guide and rotates about the armature, and when the actuator is deactivated, the indexing teeth reengage with the second plurality of teeth such that the index mechanism further rotates about the armature and the indexing teeth engage with a second portion of the vertexes, and the first plurality of teeth disengage from the index mechanism, placing the valve in a second of the plurality of open positions, and the actuator is again activated when the valve is in the second of the plurality of open positions, the armature again moves the indexing latch and valve, causing the first plurality of teeth to engage with the indexing teeth and move the index mechanism such that the indexing teeth disengage from the second portion of the plurality of vertexes and the index mechanism rotates about the armature, and when the actuator is deactivated, the indexing latch and the index mechanism move such that the valve member is placed back in the closed position.

27. The valve assembly of claim 25, wherein the actuator is again activated when the valve is in the first of the plurality of open positions, such that the armature again moves the indexing latch and valve, causing the first plurality of teeth to engage with and the indexing teeth and move the index mechanism such that the indexing teeth disengage from the first portion of the plurality of vertexes and the indexing mechanism rotates about the armature, and when the actuator is deactivated, the indexing latch and the index mechanism move such that the valve member is placed back in the closed position, and when the actuator is again activated when the valve is in the closed position, the armature again moves the indexing latch and valve, causing the first plurality of teeth to engage with the indexing teeth and move the index mechanism such that the index mechanism rotates about the armature, and when the actuator is deactivated, the indexing teeth engage with the second plurality of teeth, further rotate about the armature and engage with a second portion of the vertexes, and the first plurality of teeth disengage from the index mechanism, placing the valve in a second of the plurality of open positions.

* * * * *